US012778104B1

(12) United States Patent
Alghamdi et al.

(10) Patent No.: US 12,778,104 B1
(45) Date of Patent: Nov. 3, 2026

(54) WIND PATTERN ANALYSIS AND SENSOR INTEGRATION FOR RED PALM WEEVIL DETECTION

(71) Applicant: University of Tabuk, Tabuk (SA)

(72) Inventors: Mansoor Ali M Alghamdi, Tabuk (SA); Ahmad Hamed Al Abadleh, Tabuk (SA)

(73) Assignee: University of Tabuk, Tabuk (SA)

( * ) Notice: Subject to any disclaimer, the term of this patent is extended or adjusted under 35 U.S.C. 154(b) by 0 days.

(21) Appl. No.: 19/535,093

(22) Filed: Feb. 10, 2026

(51) Int. Cl.
*A01M 1/02* (2006.01)

(52) U.S. Cl.
CPC .................................. *A01M 1/026* (2013.01)

(58) Field of Classification Search
CPC ............................ A01M 1/026; A01K 29/005
See application file for complete search history.

(56) References Cited

U.S. PATENT DOCUMENTS 9,585,376 B2 * 3/2017 Park ....................... A01N 61/00
11,320,389 B2 * 5/2022 Sheikh ............... G01N 33/0098
11,877,571 B1 * 1/2024 Alhuwaidi ............ A01M 1/023
12,022,820 B1 * 7/2024 Zhang ..................... A01M 1/04
12,105,234 B1 * 10/2024 Files ..................... A01M 1/026
12,167,726 B1 * 12/2024 Billman ............... A01M 1/2011
12,610,936 B1 * 4/2026 Hui ........................ A01M 1/226
2017/0249512 A1 * 8/2017 Mcclatchie ............ A01G 23/00
2019/0104715 A1 4/2019 Ben Hamozeg
2021/0096106 A1 * 4/2021 Ooi ....................... A01M 1/026
2023/0160743 A1 * 5/2023 Ashry .................... G06N 3/045 73/655
2025/0194576 A1 * 6/2025 Luciano ................. G06V 20/56
2025/0200973 A1 * 6/2025 Ikeda ..................... H04N 23/60

FOREIGN PATENT DOCUMENTS

CN 203455693 U 2/2014
EP 3400795 A1 * 11/2018 ............. A01M 1/22

OTHER PUBLICATIONS

Mahmood Abdulrazzaq Mahmood, et al; A review: Detection of red palm weevil techniques; Iraqi Journal of Humanitarian, Social and Scientific Research; Print ISSN 2710-0952-Electronics ISSN 2790-1254; Nov. 2023; p. 595-610 (16 Pages).

Betty Martin, et al.; Wireless implementation of MEMS accelerometer to detect red palm weevil on palms; Research Gate; Conference Paper; 2013; 6 Pages.

* cited by examiner

*Primary Examiner* — William L Gmoser
(74) *Attorney, Agent, or Firm* — Oblon, McClelland, Maier & Neustadt, L.L.P.

(57) ABSTRACT

A system for detecting insect infestation in a palm tree includes sensors to be located along a trunk of the palm tree. Each sensor collects periodic measurements and generates sensor data signals. The system further includes a sensor node located at a midpoint of the palm tree, which includes a microprocessor and a low-power wireless transceiver. The microprocessor includes an electrical circuitry, an input panel wired to each of the sensors, and a memory having program instructions including a machine learning model having a classifier. The sensor node receives sensor data signals from the sensors, apply the sensor data signals to the classifier to determine a type and a degree of insect infestation, generate an insect infestation report, and transmit the report to a remote server.

18 Claims, 6 Drawing Sheets

WIND PATTERN ANALYSIS AND SENSOR INTEGRATION FOR RED PALM WEEVIL DETECTION

BACKGROUND

Technical Field

The present disclosure is directed to the field of agricultural monitoring systems, and more particularly to a system for detection of an insect infestation in palm trees.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Palm trees constitute a critical agricultural and economic resource in many regions of the world, particularly in arid and semi-arid climates. However, palm trees are highly susceptible to destructive insect infestations, including infestations caused by burrowing insects and larvae that develop internally within the trunk of the tree. Such infestations often progress unnoticed during early stages, as external visual symptoms typically appear only after substantial internal structural damage has already occurred.

Conventional techniques for detecting insect infestation in palm trees largely rely on manual inspection, visual assessment, or invasive probing methods. Manual inspection is labor-intensive, time-consuming, and subject to human error, particularly in large-scale plantations.

Visual inspection techniques are inherently limited, as early-stage infestations occur internally and do not immediately manifest visible external indicators. Invasive probing and chemical testing methods, while capable of identifying internal infestation, can damage the tree, introduce secondary infections, and are impractical for frequent or widespread deployment.

In recent years, sensor-based monitoring approaches have been explored to improve early detection of infestations. Certain known systems utilize acoustic sensors or vibration sensors to detect sounds or movements associated with insect activity. However, such approaches are highly sensitive to environmental noise, wind interference, and background vibrations, which can result in false positives or unreliable detection outcomes. Additionally, many existing sensor-based solutions depend on centralized data processing architectures in which raw sensor data is transmitted to remote servers or cloud platforms for analysis. Such centralized approaches increase communication overhead, power consumption, and latency, thereby limiting scalability and long-term deployment in remote agricultural environments.

Other known approaches employ individual sensor modalities or fixed threshold-based detection techniques. These known solutions often fail to account for complex environmental factors, such as varying wind conditions, geographic location, seasonal changes, and natural movement of palm trees. As a result, such solutions may be unable to reliably distinguish between normal environmental responses of a healthy tree and abnormal responses caused by internal insect infestation.

Accordingly, it is one object of the present disclosure to provide methods and systems for detecting insect infestation in palm trees that overcome the limitations of conventional inspection- and sensor-based monitoring approaches by enabling distributed, multi-modal observation of physical and environmental responses of a palm tree trunk rather than relying on isolated sensing techniques or centralized data analysis. Distributed sensing and localized analysis facilitate early identification of internal infestation-related anomalies, reduce susceptibility to environmental noise and false positives, improve scalability across large agricultural deployments, minimize power consumption and communication overhead, and provide timely, actionable infestation information, while avoiding invasive inspection methods and excessive dependence on centralized processing or manual intervention.

SUMMARY

In an exemplary embodiment, a system for detection of an insect infestation in palm trees is described. The system comprises a plurality of sensors configured to be located along a trunk of a palm tree, wherein each sensor is configured to collect periodic measurements and generate sensor data signals, a sensor node located at a midpoint of the palm tree, the sensor node including a microprocessor and a low-power wireless transceiver, wherein the microprocessor includes an electrical circuitry, an input panel wired to each of the plurality of sensors, and a memory having program instructions including a machine learning model having a classifier stored therein, that, when executed by one or more processors, cause the one or more processors to receive the sensor data signals from each of the plurality of sensors, apply the sensor data signals to the classifier, the classifier is configured to classify the sensor data signals into classes which indicate a type and a degree of an insect infestation, generate an insect infestation report, and transmit the insect infestation report to a remote server.

In another exemplary embodiment, a method for detecting an insect infestation in palm trees is described. The method includes installing a plurality of sensors along a trunk of a palm tree, collecting periodic measurements and generating sensor data signals by each sensor, installing a sensor node at a midpoint of the palm tree, the sensor node including a microprocessor and a low-power wireless transceiver, wherein the microprocessor includes an electrical circuitry, an input panel wired to each of the plurality of sensors, and a memory having program instructions including a machine learning model having a lightweight one-dimensional convolutional neural network classifier stored therein, that, when executed by one or more processors, cause the one or more processors to perform receiving the sensor data signals from each of the plurality of sensors, applying the sensor data signals to the lightweight one-dimensional convolutional neural network classifier, classifying, by the classifier, the sensor data signals into classes which indicate a type and a degree of an insect infestation, generating, by the microprocessor, an insect infestation report, and transmitting, with the low-power wireless transceiver, the insect infestation report to a remote server.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
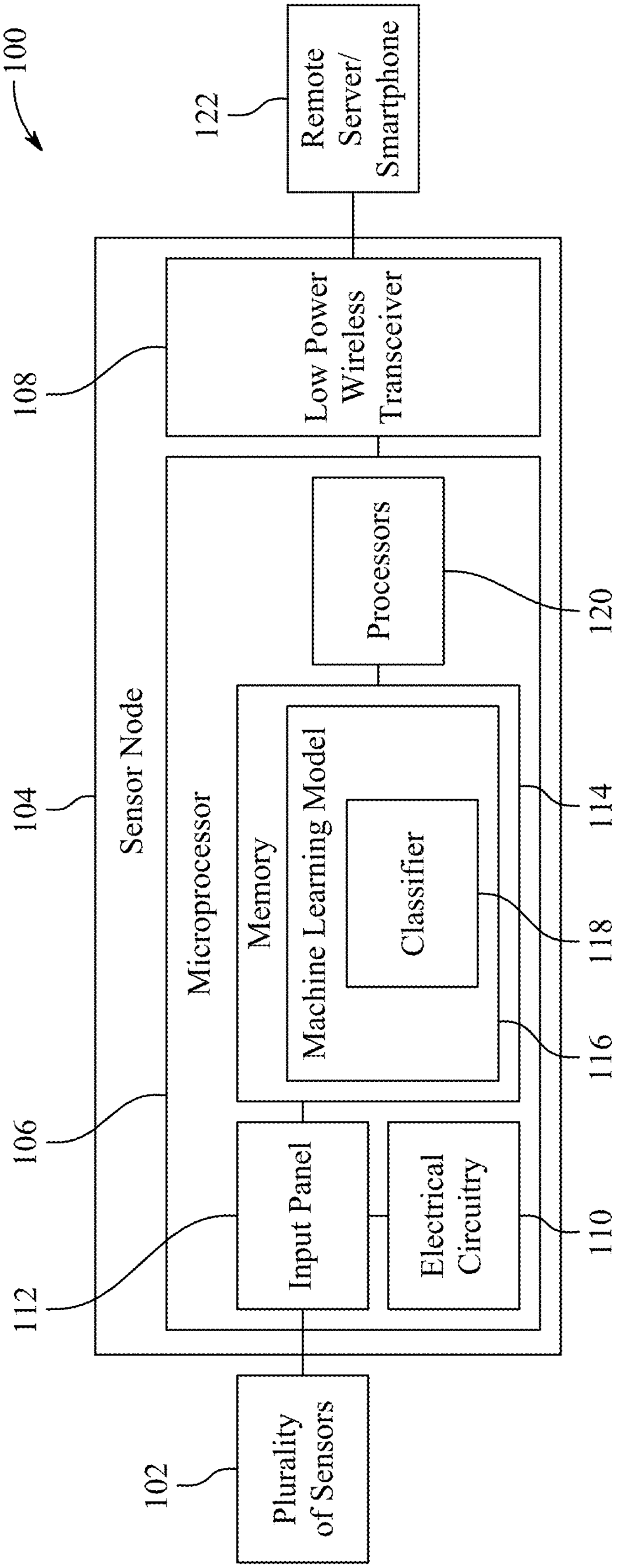
FIG. 1 is a block diagram of a system for detecting an insect infestation in palm trees, according to certain embodiments.

In the drawings, like reference numerals designate identical or corresponding parts throughout the several views. Further, as used herein, the words “a”, “an” and the like generally carry a meaning of “one or more”, unless stated otherwise.

Furthermore, the terms “approximately,” “approximate”, “about” and similar terms generally refer to ranges that include the identified value within a margin of 20%, 10%, or preferably 5%, and any values therebetween.

Aspects of the present disclosure are directed to systems and methods for detecting insect infestation (e.g., red palm weevil infestation) in palm trees, through decentralized, tree-level sensing and analysis without reliance on centralized data processing. The system includes a plurality of sensors disposed along a trunk of a palm tree and configured to monitor physical and environmental responses of the palm tree. The system involves a distributed placement of each sensor and the use of multiple sensing modalities to facilitate localized observation of structural and environmental characteristics associated with internal insect activity. The system further includes a sensor node positioned at, for example, a midpoint of the palm tree. The sensor node is equipped with machine learning capabilities, including one or more lightweight machine learning models configured to perform real-time, on-site analysis and anomaly detection using sensor data. Such self-learning sensor nodes eliminate a need to transmit raw sensor data to a centralized processing unit for further processing. The plurality of sensors includes multiple sensing modalities, including accelerometers, wind load sensors, tilt sensors, humidity sensors, and ultrasonic sensors, which collectively enable multi-sensor data fusion for localized observation of structural behavior, internal cavity formation, and moisture distribution associated with internal insect activity. The sensor node is configured to perform adaptive edge learning, wherein the embedded machine learning models are incrementally updated at the sensor node to dynamically adjust to changing environmental conditions and infestation behavior without centralized retraining. Based on the localized analysis and classification of sensor data, the sensor node determines a type and a degree of insect infestation and generates an infestation report directly at the palm tree. The sensor node includes an edge communication unit, such as a low-power wireless transceiver, configured to transmit localized infestation reports and real-time alerts to a remote server or smartphone. Decentralized processing, localized alert generation, and ultra-low power operation reduce communication overhead and energy consumption, improve scalability and deployment longevity across large agricultural environments, and enable timely, actionable infestation detection as an efficient alternative to conventional inspection-based and centrally processed pest monitoring systems.

Referring to FIG. 1, illustrated is a block diagram of a system 100 for detecting an insect infestation in palm trees. The system 100 is configured to enable decentralized, tree-level sensing and analysis for early identification of internal insect infestation without reliance on centralized data processing. The system 100 is designed for energy efficiency, reliability, and precise multi-modal sensing. The insect infestation is due to red palm weevils and larvae of red palm weevils. The system 100 includes a plurality of sensors 102 configured to be located along a trunk of a palm tree (shown in FIG. 2). Each of the plurality of sensors 102 is configured to collect periodic measurements associated with physical and environmental responses of the palm tree and to generate corresponding sensor data signals.

The plurality of sensors 102 may include one or more tilt sensors positioned above and below a midpoint of the palm tree trunk, one or more wind load sensors positioned at different locations along the trunk to measure wind pressure and direction, an accelerometer configured to monitor sway movement and vibration of the palm tree trunk, a humidity sensor partially embedded near the midpoint of the trunk to monitor internal moisture changes, and a plurality of ultrasonic transducers disposed circumferentially around the trunk at one or more vertical locations to detect internal structural cavities formed due to insect activity.

The system 100 includes a sensor node 104 positioned at a midpoint of the palm tree trunk and operatively coupled to the plurality of sensors 102. The sensor node 104 includes a microprocessor 106, which includes an input panel 112 that is wired to each of the plurality of sensors 102 and configured to receive the sensor data signals generated by each of the plurality of sensors 102. The microprocessor 106 includes an electrical circuitry 110 configured to support signal conditioning, power regulation, and interfacing between the plurality of sensors 102 and processing components of the sensor node 104.

The microprocessor 106 includes a memory 114 and one or more processors 120. The memory 114 may include any computer-readable medium known in the art, including, for example, volatile memory, such as Static Random Access Memory (SRAM) and Dynamic Random Access Memory (DRAM) and/or nonvolatile memory, such as Read Only Memory (ROM), erasable programmable ROM, flash memories, hard disks, optical disks, and magnetic tapes.

The one or more processors 120 are configured to fetch and execute the computer-readable program instructions stored in the memory. The one or more processors 120 are configured to execute a sequence of machine-readable instructions, which may be embodied in a program or software. The machine-readable instructions can be directed to the one or more processors 120, which execute the machine-readable instructions to implement the methods of the present disclosure. The one or more processors 120 may be implemented as one or more microprocessors, microcomputers, microcontrollers, digital signal processors, central processing units, state machines, logic circuitries, and/or any devices that manipulate signals based on operational instructions.

The memory 114 stores program instructions executable by the one or more processors 120, including a machine learning model 116 having a classifier 118 stored therein, that, when executed by the one or more processors 120, cause the one or more processors 120 to receive the sensor data signals from the plurality of sensors 102, apply the sensor data signals to the classifier 118 to classify the sensor data signals into one or more classes indicative of a type and a degree of insect infestation within the palm tree trunk, generate an insect infestation report, and transmit the insect infestation report to a remote server 122.

The sensor node 104 operates according to a periodic wake-up schedule to conserve energy and dynamically adjusts sensing and processing frequency upon detection of infestation-related anomalies. The classifier 118 may correspond to a lightweight one-dimensional convolutional neural network classifier 118 or a decision tree network configured for execution at the sensor node 104. The term "lightweight" denotes that the classifier 118 is configured to operate with minimal preprocessing of the sensor data prior to the classification.

The sensor node 104 includes a low-power wireless transceiver 108 configured to transmit the insect infestation report to the remote server 122. The remote server 122 may be a smartphone (hereinafter may also be referred to as "a remote server/smartphone 122") loaded with a smartphone application. The smartphone application may be configured to receive the insect infestation report from the sensor node 104, analyze the infestation report to determine a cavity mapping of the palm tree trunk, an angle shift history and a moisture profile and generate any one of a real-time alert, an infestation risk level, a recommended immediate action and geolocation information regarding the infestation.

The machine learning model 116 embedded within the sensor node 104 may also be referred to as a Tiny Machine Learning (TinyML) model. TinyML generally refers to machine learning techniques and models specifically designed for execution on low-power and resource-constrained computing devices, such as microcontrollers, embedded processors, and Internet-of-Things (IoT) sensor platforms. TinyML models are configured to operate with minimal power consumption and limited computational resources while enabling real-time data analysis and decision-making directly at the device, thereby providing edge intelligence without reliance on cloud-based processing.

The TinyML model is optimized for execution on resource-constrained hardware having limited memory capacity (measured in KBs of RAM and MBs of flash memory) and processing speed (measured in MHz, not GHz). Such optimization may include, for example, reduced model complexity, quantization, pruning, or other model compression techniques that enable efficient inference using kilobytes of memory and low clock frequencies. The TinyML model may be executed by the microprocessor 106 or specialized processor operating in an ultra-low-power range, such as on the order of milliwatts or less, thereby enabling always-on or long-duration operation using battery power or energy harvesting.

The TinyML model enables on-device inference at the sensor node 104, allowing sensor data to be analyzed locally as it is collected. Localized inference reduces latency associated with remote processing, minimizes bandwidth usage by avoiding transmission of raw sensor data, and enhances data privacy by retaining sensitive sensor information at the device. In this manner, the TinyML model supports real-time anomaly detection and classification at the edge, which is particularly advantageous for large-scale, distributed sensing environments.

In a non-limiting example, the TinyML model may be executed on microcontrollers or processors based on architectures suitable for embedded machine learning, including, but not limited to, microcontrollers from the ARM Cortex-M family, dual-core microcontrollers, or specialized low-power neural processing units (ARM Corex-M microcontrollers are manufactured by Arm Holdings plc, 20 Rose Orchard Way, San Jose, California United States of America 95134-1358). Such processors may include integrated or external machine learning accelerators configured to improve inference efficiency while maintaining low energy consumption. Example hardware platforms may include general-purpose microcontrollers, IoT development boards, or specialized neural decision processors optimized for sensor-based inference.

In a further non-limiting example, the TinyML model may be developed using software frameworks that support deployment of optimized machine learning models on embedded devices. Such frameworks may include microcontroller-oriented inference engines and development tools that enable training of machine learning models on higher-performance computing systems and subsequent deployment of compressed and optimized versions to the sensor node 104. The TinyML model enables scalable deployment of intelligent sensing capabilities across a large number of distributed devices, facilitating pervasive and energy-efficient computing in applications such as healthcare, agriculture, environmental monitoring, industrial sensing, and anomaly detection.

To accommodate the specific demands of real-time, multi-sensor insect infestation detection in palm trees, the present disclosure contemplates a set of hardware-level and software-level enhancements applied to a TinyML-capable embedded platform, as shown in Table 1. Such enhancements are described herein as illustrative examples and are not intended to limit the scope of the present disclosure.

TABLE 1

Hardware Stack Overview

| Layer | Component | Function |
|---|---|---|
| Sensing | Wind Load Sensor (Strain Gauge) | Measures lateral wind stress acting on the trunk |
| Sensing | BNO055 IMU | Captures tilt and vibration across 3 axes |
| Sensing | Ultrasonic Transducer | Estimates internal cavity formation by larvae |
| Processing | TinyML Microcontroller (e.g., Arduino Nicla (manufactured by Arduino, owned by Qualcomm, located at 5775, Morehouse Drive, San Diego, CA 92121, USA)) | Executes model inference locally |
| Communication | LoRa/LoRaWAN Module | Sends alerts wirelessly at low power |
| Power | Rechargeable LiPo + Solar Panel | Enables long-term deployment off-grid |

The embedded TinyML platform is extended to interface with an expanded set of sensors to support multi-modal sensing. The sensor interfaces may include wind load sensors implemented as strain gauge-based modules configured to capture lateral wind-induced stress acting on the palm tree trunk. The platform may interface with a multi-axis inertial measurement unit, such as a six-degrees-of-freedom (6-DOF) IMU, configured to simultaneously record tilt behavior and micro-vibrations of the palm tree trunk. Additionally, one or more ultrasonic sensors may be interfaced with the platform to detect internal cavity changes associated with larval tunneling, and one or more humidity probes may be interfaced to monitor internal moisture levels within the trunk as a secondary indicator of infestation.

The embedded platform incorporates a low-power energy management system, which may include a solar-rechargeable lithium polymer battery and associated power regulation circuitry. Event-triggered activation logic may be employed to selectively activate sensing, processing, and communication functions based on detected environmental conditions or anomaly indicators, thereby optimizing energy consumption and extending field deployment duration.

The communication capabilities of the embedded platform are extended through the incorporation of long-range, low-power wireless communication modules, such as LoRaWAN-compatible transceivers, to enable wide-area data transmission suitable for large-scale agricultural deployments while maintaining low power operation.

The embedded software executed by the TinyML platform is modified to include a sensor fusion layer configured to integrate multi-modal sensor data in real time. The sensor fusion layer may employ a Kalman filter-based algorithm or similar estimation technique to combine sensor measurements and suppress environmental noise prior to feature extraction and classification.

The embedded software may be extended to integrate a TinyML runtime environment capable of executing machine learning inference directly on the embedded platform. For example, the firmware may be configured to support execution of a convolutional neural network classifier using TensorFlow Lite for Microcontrollers or an equivalent embedded inference framework, thereby enabling on-node analysis of sensor data without reliance on external processing systems.

In addition, the firmware may include an over-the-air (OTA) update mechanism configured to enable periodic or condition-triggered updates of software components, firmware logic, or machine learning model parameters. Such OTA update capability supports adaptive learning and long-term system maintenance after deployment.

The embedded software implements event-driven sampling logic, wherein sensing, data collection, and classification windows dynamically adapt based on ambient wind activity, previously detected anomalies, or other environmental triggers. This event-driven operation conserves power while maintaining detection readiness under relevant operating conditions.

TABLE 2

Exemplary operational characteristics of the system

| Capability | Specification |
|---|---|
| Detection Latency | ~12 sec |
| Deployment Density | 1 sensor per tree |
| Communication | LoRaWAN / MQTT alerts |
| Autonomy | ~8 months battery operation |

Table 2 summarizes how the system 100 behaves when deployed, rather than how it is built. Specifically, the system 100 captures detection latency, which is the time taken by the decentralized sensor node to generate an infestation decision after data collection (for example, ≈12 seconds). Deployment density is one sensor node per palm tree. Communication uses low-bandwidth protocols (e.g., LoRaWAN/MQTT) for alerts. Autonomy of approximately eight months of battery-powered operation. This reflects power efficiency and duty-cycle behavior. LoRaWAN is managed by the non-profit LoRa Alliance (located at LoRa Alliance® 39221 Paseo Padre Pkwy, Suite J Fremont, California 94538, United States of America), while MQTT is an open, standard protocol maintained by (Organization for the Advancement of Structured Information Standards) OASIS located at 400 TradeCenter, Suite 5900, Woburn, Massachusetts, United States of America.

Thus, the present disclosure describes the system 100, which is embedded with the TinyML model at the sensor node 104, configured to perform real-time, on-site analysis and anomaly detection using locally collected sensor data, instead of transmitting raw sensor data to a centralized processing unit. The transition to fully decentralized, edge-level processing distinguishes the described system 100 from conventional approaches. The present disclosure provides multi-sensor fusion with additional sensing modalities beyond accelerometers, wind load sensors, and tilt sensors, including humidity sensors and ultrasonic sensors, thereby enabling internal cavity detection and internal moisture monitoring associated with early stages of red palm weevil infestation, capabilities that are absent from the cited references. In addition, the present disclosure supports adaptive edge learning, where the embedded TinyML model undergoes incremental training at the sensor node 104 to dynamically adjust to evolving environmental conditions and pest behavior without requiring centralized retraining. The present disclosure enables localized, real-time alert generation at the tree level, without reliance on cloud-based processing, thereby reducing response time and false positives, and improving operational feasibility across large-scale palm tree plantations. Moreover, the sensor node 104 is configured for ultra-low power operation and extended field deployment with minimal energy consumption, thereby enabling economic scalability for large-scale agricultural deployments and addressing limitations commonly associated with conventional centralized monitoring systems.

Figure 2:
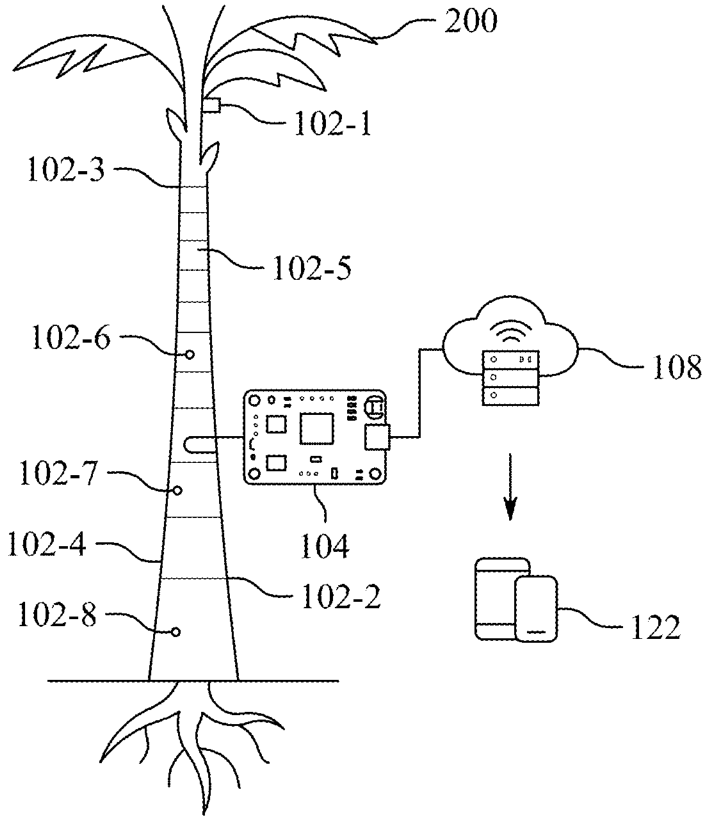
FIG. 2 is a perspective side view of a palm tree depicting placement of a plurality of sensors and a sensor node for detecting insect infestation, according to certain embodiments.

Referring to FIG. 2, illustrated is a perspective side view of a palm tree 200 depicting placement of the plurality of sensors 102 and the sensor node 104 for detecting insect infestation. The palm tree 200 includes a trunk along which the plurality of sensors 102 are distributed at different vertical locations to monitor physical and environmental responses associated with internal insect activity.

The plurality of sensors 102 may include at least one tilt sensor 102-1 configured to be located above the midpoint of the palm tree trunk. The plurality of sensors 102 may include at least one tilt sensor 102-2 configured to be located below the midpoint of the palm tree trunk. The plurality of sensors 102 may include a first wind load sensor 102-3 configured to be located above the midpoint of the palm tree trunk. The plurality of sensors 102 may further include a second wind load sensor 102-4 configured to be located below the midpoint of the palm tree trunk. The plurality of sensors 102 may include at least one accelerometer 102-5 configured to be located above the midpoint of the palm tree trunk. The plurality of sensors 102 may include a humidity sensor 102-6 configured to be partially embedded near the midpoint of the palm tree trunk (trunk tissue) in close proximity (within a few centimeters) to the sensor node 104. The plurality of sensors 102 may include a first plurality of ultrasonic transducers 102-7 configured to be located around the circumference of the palm tree trunk directly below the midpoint of the palm tree trunk. The plurality of sensors 102 may include a second plurality of ultrasonic transducers 102-8 configured to be located around the circumference of the palm tree trunk directly near the base of the palm tree trunk.

In the non-limiting example illustrated in FIG. 2, the plurality of sensors 102 is shown at specific locations along the trunk of the palm tree 200 for purposes of illustration and explanation. However, it should be understood that the number, type, orientation, and vertical positioning of the plurality of sensors 102 are not fixed and may vary depending on factors such as palm tree height, trunk geometry, environmental conditions, geographic location, and target insect species. In another aspect, one or more sensors may be positioned at different heights, circumferential locations, or depths within the trunk, or multiple sensors of the same type may be deployed at additional locations along the trunk. The sensor node 104 may likewise be positioned at locations other than the midpoint of the trunk while remaining operatively coupled to the plurality of sensors 102. Such variations are intended to fall within the scope of the present invention, provided that localized sensing and on-node analysis of sensor data are performed to detect insect infestation.

The sensor node 104 is located near the midpoint of the palm tree in order to minimize the length of the wiring connecting the plurality of sensors to the sensor node 104. In particular, the sensor node 104 may be implemented as a compact embedded computing device mounted on a surface of the palm tree trunk at mid-height, where it serves as a central unit for data collection, edge processing, and wireless communication. The sensor node 104 integrates with the plurality of sensors 102 via low-power wired interfaces. In some non-limiting examples, the sensor node 104 may have dimensions on the order of a few tens of millimeters, such as approximately 24 mm×28 mm, although other sizes and form factors may be employed without departing from the scope of the present disclosure.

The sensor node 104 includes the microprocessor 106 and an edge communications unit, such as the low-power wireless transceiver 108, configured to transmit the infestation report and localized real-time alerts to the remote server or smartphone 122. The low-power wireless transceiver 108 may support one or more low-power communication protocols, including, but not limited to, LoRa, Zigbee, Bluetooth Low Energy (BLE), or similar technologies suitable for agricultural deployments, thereby enabling low-bandwidth transmission of anomaly or infestation reports while optimizing energy consumption and supporting scalability across large plantations.

The plurality of sensors 102 is operatively coupled to the sensor node 104 via low-power wired connections, which reduce communication latency, minimize energy overhead, and improve reliability of sensor data acquisition in outdoor and agricultural environments. The sensor node 104 may be powered by an integrated power source, such as a long-life battery and/or a compact solar panel housed within the sensor node enclosure, thereby supporting extended autonomous operation and deployment in remote locations.

The sensor node 104 is configured for compact and ruggedized deployment to withstand environmental exposure in field conditions and may be implemented using commercially available TinyML-capable hardware platforms, including microcontrollers or specialized processors such as Syntiant NDP-series processors or similar embedded TinyML boards. Such hardware platforms enable real-time, on-node analysis of sensor data while maintaining ultra-low power operation, thereby facilitating reliable and scalable deployment of decentralized insect infestation detection systems across large or remote palm tree plantations.

The microprocessor 106 embedded within the sensor node 104 may be configured to monitor the sensor data signals generated by periodic sensor measurements made by the at least one tilt sensor 102-1 configured to be located above the midpoint of the palm tree trunk and the at least one tilt sensor 102-2 configured to be located below the midpoint of the palm tree trunk and record tilt angle deviations greater than three degrees which are sustained for greater than forty-eight hours which are indicative of internal structural degradation in the palm tree trunk.

The microprocessor 106 may be configured to monitor sensor data signals generated by periodic sensor measurements made by the first wind load sensor 102-3 and the second wind load sensor 102-4, record a pressure of a wind and a direction of the wind, determine a stress on the palm tree trunk due to differences between the sensor data signals generated by the first wind load sensor 102-3 and the second wind load sensor 102-4, monitor a sway movement of the palm tree trunk and determine whether the differences between the sensor data signals generated by the first wind load sensor 102-3 and the second wind load sensor 102-3 indicate infestation internal to the palm tree trunk due to insect infestation.

The microprocessor 106 may be configured to monitor the sway movement of the palm tree trunk at a sampling frequency in a range of about 12 Hz to about 50 Hz within a time window of about 10 seconds and during a wind speed in a range of about 10 km/hr to about 30 km/hr. The selected sampling frequency and time window enable capture of dynamic sway and vibration characteristics of the palm tree trunk that are responsive to natural wind excitation while limiting unnecessary data acquisition outside relevant operating conditions. Monitoring sway behavior within the specified wind speed range facilitates differentiation between normal structural responses of a healthy palm tree and abnormal responses associated with internal structural degradation caused by insect infestation.

The microprocessor 106 may be configured to adjust the sampling frequency based on a geographical location of the sensor node 104 and a historical wind profile. The geographical location may correspond to regional climatic conditions, prevailing wind patterns, or plantation-specific environmental characteristics that influence natural sway behavior of the palm tree. The historical wind profile may include previously observed wind speed ranges, wind direction patterns, or temporal variations in wind activity recorded at the sensor node 104 or obtained from stored sensor data. By dynamically adjusting the sampling frequency in view of the geographical location and historical wind profile, the sensor node 104 may optimize data acquisition to capture relevant sway and structural responses while reducing unnecessary sensing and processing during low-information conditions, thereby improving detection accuracy, power efficiency, and long-term operational stability.

The microprocessor 106 may be configured to monitor sensor data signals generated by periodic sensor measurements made by the at least one accelerometer 102-5 and detect irregular sway patterns and vibration indication of internal infestation of the palm tree trunk.

The microprocessor 106 may be configured to monitor sensor data signals generated by periodic sensor measurements made by the humidity sensor 102-6 of moisture changes within the palm tree trunk, indicative of internal moisture distribution due to larval tunneling of insects. The accelerometer-based measurements may capture deviations in amplitude, frequency, symmetry, or damping behavior of trunk movement relative to baseline conditions associated with a healthy palm tree. Such irregular sway and vibration patterns may result from internal structural weakening or material loss caused by insect activity and may be correlated with data obtained from other sensor modalities to improve detection accuracy and reduce false positives.

The microprocessor 106 may be configured to monitor sensor data signals generated by periodic sensor measurements made by the first plurality of ultrasonic transducers 102-7 and the second plurality of ultrasonic transducers 102-8 and map internal structure cavities within the palm tree trunk due to movement of insect larva. The ultrasonic transducers 102-7, 102-8 may be configured to transmit and receive ultrasonic signals that propagate through trunk material, wherein variations in signal reflection, attenuation, or time-of-flight are indicative of internal voids, tunnels, or material discontinuities formed by larval activity. The microprocessor 106 may analyze the ultrasonic transducer data to generate a representation of cavity location, size, or progression within the trunk, and may correlate such cavity mapping information with data obtained from other sensor modalities to improve accuracy of infestation detection and assessment of infestation severity.

The sensor node 104 is configured to power on during a periodic wake-up interval in a range of one hour to two hours and collect the sensor data signals during a data collection interval in a range of 10 seconds to 20 seconds until an insect infestation is detected, then collect the sensor data signals about every 30 minutes. The adaptive wake-up and data collection strategy enables early detection of infestation while conserving power during normal operating conditions, thereby supporting extended field deployment and reliable operation of the system 100.

The sensor node 104 may be configured to execute program instructions for the operation of each of the embedded sensors, including data collection, preprocessing, threshold evaluation, and machine learning-based classification. The sensor node 104 performs an initial calibration phase to establish baseline sensor measurements corresponding to a healthy palm tree. The baseline measurements may be stored in the memory 114 and subsequently used as reference data for detecting deviations indicative of insect infestation. During operation, the sensor node 104 may apply signal conditioning techniques, such as low-pass filtering or similar noise-mitigation methods, to reduce the impact of environmental noise and transient disturbances in the sensor data.

The sensor node 104 may establish one or more threshold conditions associated with different sensor modalities. For example, sustained tilt angle deviations which exceed approximately three degrees over a period of approximately forty-eight hours may be indicative of internal structural degradation. Wind load sensor data may be evaluated for deviations from baseline sway signatures associated with healthy palm trees. Humidity sensor data may be monitored for sustained internal moisture deviations which exceeds approximately ten percent relative to baseline conditions. Ultrasonic sensor data may be evaluated to detect internal structural cavities having a volume which exceeds approximately one cubic centimeter, which may be associated with larval tunneling. Such thresholds may be used individually or in combination to trigger further analysis or classification by the machine learning model.

The machine learning model 116 (also referred to as the TinyML model) embedded within the sensor node 104 may include a lightweight convolutional neural network classifier 118 or a decision tree classifier optimized for execution on resource-constrained hardware. Initial training of the machine learning model 116 may be performed using simulated or synthetic datasets that model physical and environmental responses of healthy palm trees and palm trees affected by insect infestation. The classifier 118 is tailored to analyze physiological signal features extracted from palm trees, including non-acoustic modalities such as tilt behavior, wind-induced sway, internal moisture variation, and ultrasonic cavity responses, rather than general-purpose audio or signal recognition tasks.

The machine learning model 116 may be compiled and deployed using a low-footprint inference engine suitable for embedded systems, such as TensorFlow Lite for microcontrollers or an equivalent embedded inference framework compatible with TinyML-capable hardware, including specialized neural processing devices. The combination of localized preprocessing, threshold-based evaluation, and embedded machine learning inference enables the sensor node 104 to perform real-time, on-node analysis and infestation classification while maintaining low power consumption and avoiding transmission of raw sensor data to centralized processing systems.

The remote server (cloud server) or the smartphone 122 loaded with the smartphone application may be configured to receive the insect infestation report from the sensor node 104 via the low-power wireless transceiver 108, analyze the infestation report to determine a cavity mapping of the palm tree trunk, an angle shift history and a moisture profile and generate any one of a real-time alert, an infestation risk level, a recommended immediate action and geolocation information regarding the infestation. The smartphone application serves as both a notification receiver and a visualization interface, with modular support for different sensor types and farm locations. Unlike conventional systems, the smartphone application supports non-audio-based metrics, including cavity mapping, angle shift history, and moisture profiles.

The low-power wireless transceiver 108 includes an over-the-air update program configured to receive updates for the sensor node 104. The over-the-air update program enables wireless delivery of software, firmware, or operating system updates to the sensor node 104 through a communication network without requiring physical access to the sensor node. Such over-the-air updates, also referred to as over-the-air programming, may be delivered via one or more wireless networks, including Wi-Fi networks, cellular networks, or other wireless communication technologies. The over-the-air update program may be configured to update program instructions stored in the memory 114 of the sensor node 104, including firmware components, operating system components, and machine learning model parameters or classifier logic executed by the sensor node 104. By supporting over-the-air updates, the sensor node 104 may be remotely maintained, enhanced, or reconfigured after deployment, thereby improving operational flexibility, long-term reliability, and adaptability of the system without manual intervention.

A cloud based analytics platform in communication with the remote server or smartphone 122 is configured to analyze the infestation report and generate historical trends and visual mapping associated with insect infestation across one or more palm trees. The cloud-based analytics platform may aggregate infestation reports received over time to derive temporal trends, infestation progression patterns, and comparative analytics across different geographic locations or plantation areas. The visual mapping may include graphical representations of infestation severity, cavity distribution, moisture variation, or structural indicators associated with individual palm trees or groups of palm trees. In examples, the cloud-based analytics platform operates as a supplementary analytics layer, wherein core infestation detection and classification are performed locally at the sensor node, and cloud-based analysis is used to provide enhanced visualization, long-term data storage, and decision-support insights.

The system 100 employs a decentralized architecture in which individual sensor nodes operate as standalone units without direct inter-sensor communication between neighboring sensor nodes of one or more palm trees. Each sensor node independently performs data collection, preprocessing, machine learning-based analysis, and alert generation based on locally acquired sensor data. The absence of direct inter-node communication reduces network complexity, minimizes power consumption, and improves operational reliability, while ensuring that infestation detection results remain localized, interpretable, and attributable to individual palm trees. Each sensor node transmits its own infestation report or alert independently, thereby maintaining simplicity, efficiency, and clarity of detection outcomes across large-scale deployments.

Development and validation of the embedded machine learning model 116 may proceed through simulation-based modeling and synthetic data generation prior to physical field deployment. Such simulation-based modeling may be used to represent mechanical, environmental, and infestation-related behaviors of palm trees under varying conditions to ensure robustness of the classifier 118. In a further aspect, a validation campaign may be conducted following assembly of prototype hardware, including field trials performed in collaboration with agricultural partners, to evaluate detection performance, energy efficiency, and operational scalability under real-world conditions.

Figure 3:
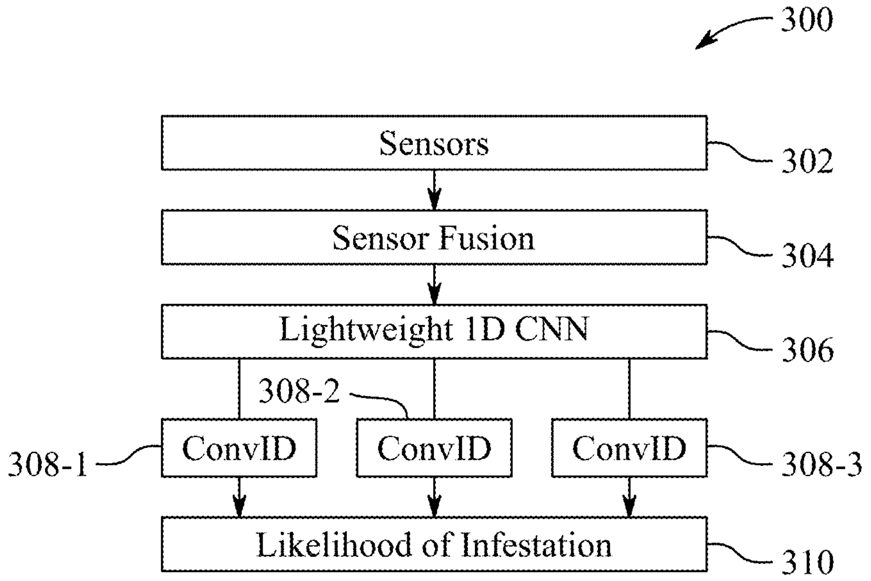
FIG. 3 is a functional block diagram of a machine learning classifier for detecting insect infestation in palm trees, according to certain embodiments.

Referring to FIG. 3, illustrated is a functional block diagram 300 of the classifier 118 for detecting insect infestation in palm trees. The functional block diagram 300 represents a logical processing pipeline executed at the sensor node 104 described with respect to FIGS. 1 and 2, for analyzing sensor data signals collected from the plurality of sensors 102 deployed along the palm tree trunk.

As shown, at block 302, the plurality of sensors 102 may collect periodic measurements and generate sensor data signals. The sensor data signals represent multi-modal, time-series measurements corresponding to physical and environmental responses of the palm tree under natural operating conditions. The sensor data signals may include, but are not limited to, tilt angle measurements indicative of angular displacement of the palm tree trunk, wind load measurements indicative of wind pressure and wind direction acting on the trunk, accelerometer measurements indicative of sway movement and vibration patterns of the trunk, humidity measurements indicative of internal moisture variations within the trunk, and ultrasonic measurements indicative of internal structural characteristics and cavity formation within the trunk.

At block 304, the sensor data signals are provided to a sensor fusion, which is configured to combine and correlate sensor data signals from the plurality of sensors 102. The sensor fusion may perform signal alignment, normalization, filtering, and feature aggregation to generate a fused representation of the sensor data signals. The fused sensor data enables the classifier 118 to distinguish normal environmental responses of a healthy palm tree from responses indicative of internal insect infestation.

At block 304, the fused sensor data is then applied to the classifier 118. The classifier 118 may be a lightweight one-dimensional convolutional neural network (1D CNN) classifier that is embedded in a TinyML-capable microcontroller (such as Arduino Nicla Sense ME). The classifier is designed to detect early signs of red palm weevil infestation by analyzing time-series data from the plurality of sensors 102.

At block 306, the lightweight 1D CNN classifier processes the fused sensor data using one or more convolutional layers (e.g., Conv 1D 308-1, Conv 1D 308-2, and Conv 1D 308-3), each configured to extract temporal features associated with sway behavior, structural deformation, moisture variation, and internal cavity formation within the palm tree trunk.

In particular, the 1D CNN classifier receives as input a sliding time window of approximately 10 seconds of synchronized multi-sensor data. The classifier 118 may include a Conv 1D layer 1 having thirty-two (32) filters, a kernel size of three (3), and a rectified linear unit (ReLU) activation function, followed by a max-pooling layer. The classifier 118 may include a Conv 1D layer 2 having sixty-four (64) filters, a kernel size of three (3), and a ReLU activation function, followed by an additional max-pooling layer. Output features from the convolutional layers may be provided to a dense layer having sixty-four (64) units with a dropout rate of approximately 0.3 for regularization. The classifier 118 may include an output layer configured as a two-class softmax layer that generates classification outputs corresponding to healthy and infested palm tree conditions.

In an embedded implementation, the classifier 118 may be deployed using TensorFlow Lite for Microcontrollers or an equivalent low-footprint inference framework configured for execution on TinyML hardware. The classifier 118 performs on-device inference within a runtime of less than approximately 10 milliseconds and occupies a memory footprint of less than approximately 200 KB. The embedded implementation may support over-the-air (OTA) updates, enabling remote updates to the classifier parameters or logic to support adaptive learning and performance improvement after deployment.

Initial training of the classifier 118 may be performed using simulation-based modeling and synthetic data generation prior to field deployment. Simulation tools such as MATLAB Simscape and COMSOL Multiphysics may be used to model physical dynamics of healthy and infested palm trees under varying wind conditions, including wind speeds in a range of approximately 12 km/h to 40 km/h. Training datasets may include approximately two thousand five hundred (2500) labeled samples, wherein infested palm trees are modeled with internal stiffness loss, sway asymmetry, tilt deviation, and altered damping behavior. Labels may be assigned based on structural deformation characteristics and damping response profiles associated with infestation.

The classifier 118 may be trained to detect infestation-related structural deviations, including sway asymmetry which exceeds approximately 10% between lateral oscillation profiles, persistent tilt deviations which exceeds approximately 2.5 degrees during sustained wind periods, and reduced damping ratios indicative of internal tunneling or material loss caused by larval activity. Synthetic training data may be normalized and augmented using techniques such as noise injection and temporal warping to improve generalization. Model evaluation may include k-fold cross-validation, such as five-fold cross-validation, to assess detection accuracy, which in certain evaluations achieved an accuracy which exceeds 92%. Such evaluation may be further validated through trials conducted using a plurality of deployed sensor nodes.

The classifier 118 is developed under structured environmental and mechanical constraints reflecting realistic field conditions. Low wind speed ranges, such as approximately 12 to 19 km/h, may be used to establish the baseline sway and tilt behavior of healthy palm trees. Medium wind speed ranges, such as approximately 20 to 30 km/h, may be used to emphasize deviations associated with infestation-induced structural weakening. Higher wind speed ranges, such as approximately 31 to 40 kilometers per hour, may be excluded from training to reduce noise dominance and overfitting, and may instead be reserved for robustness testing. Sampling and classification operations may be performed using sampling frequencies in a range of approximately 25 to 50 hertz and time windows of approximately 10 seconds, and may be triggered only during wind events within selected wind speed ranges of 12-30 km/h.

At block 310, outputs of the classifier 118 are provided to a classification output stage, which generates a classification result indicative of whether insect infestation is present and, a type and a degree of infestation. The classification result may include an infestation likelihood, severity level, or risk category associated with the palm tree.

The classifier 306 supports adaptive edge learning, wherein model parameters are incrementally updated at the sensor node 104 based on locally observed data, changing environmental conditions, or evolving infestation behavior, without requiring centralized retraining or transmission of raw sensor data. To support such operation, the sensor node 104 may include hardware and software enhancements, including expanded sensor interfaces for wind load sensors, multi-axis inertial measurement units, ultrasonic sensors, and humidity probes; low-power energy management circuitry incorporating solar-rechargeable battery systems; and event-driven sampling logic that dynamically adjusts sensing and processing behavior based on detected wind activity or previously identified anomalies.

To enhance specificity of the machine learning model during training, a set of biomechanical constraints associated with palm tree deformation under infestation conditions may be applied to the training datasets. Such constraints are used to guide feature learning and class separation during model training and are not required to be explicitly evaluated during runtime classification. The biomechanical constraints may include a sway asymmetry threshold, wherein training samples are labeled to reflect a difference which exceeds approximately 10% between lateral oscillation profiles on opposite sides of the palm tree trunk. The biomechanical constraints may include a persistent tilt deviation threshold, wherein training samples represent angular displacements which exceeds approximately 2.5° during sustained wind periods, indicative of long-term structural displacement caused by internal degradation. Additionally, the constraints may include variations in damping behavior, wherein infested palm trees exhibit lower damping ratios relative to healthy trees due to internal tunneling and material loss, as modeled through signal decay analysis of vibration or sway responses. These biomechanical constraints are incorporated into the training process to improve discrimination between healthy and infested classes and to increase robustness of the trained classifier under varying environmental conditions.

Figure 4:
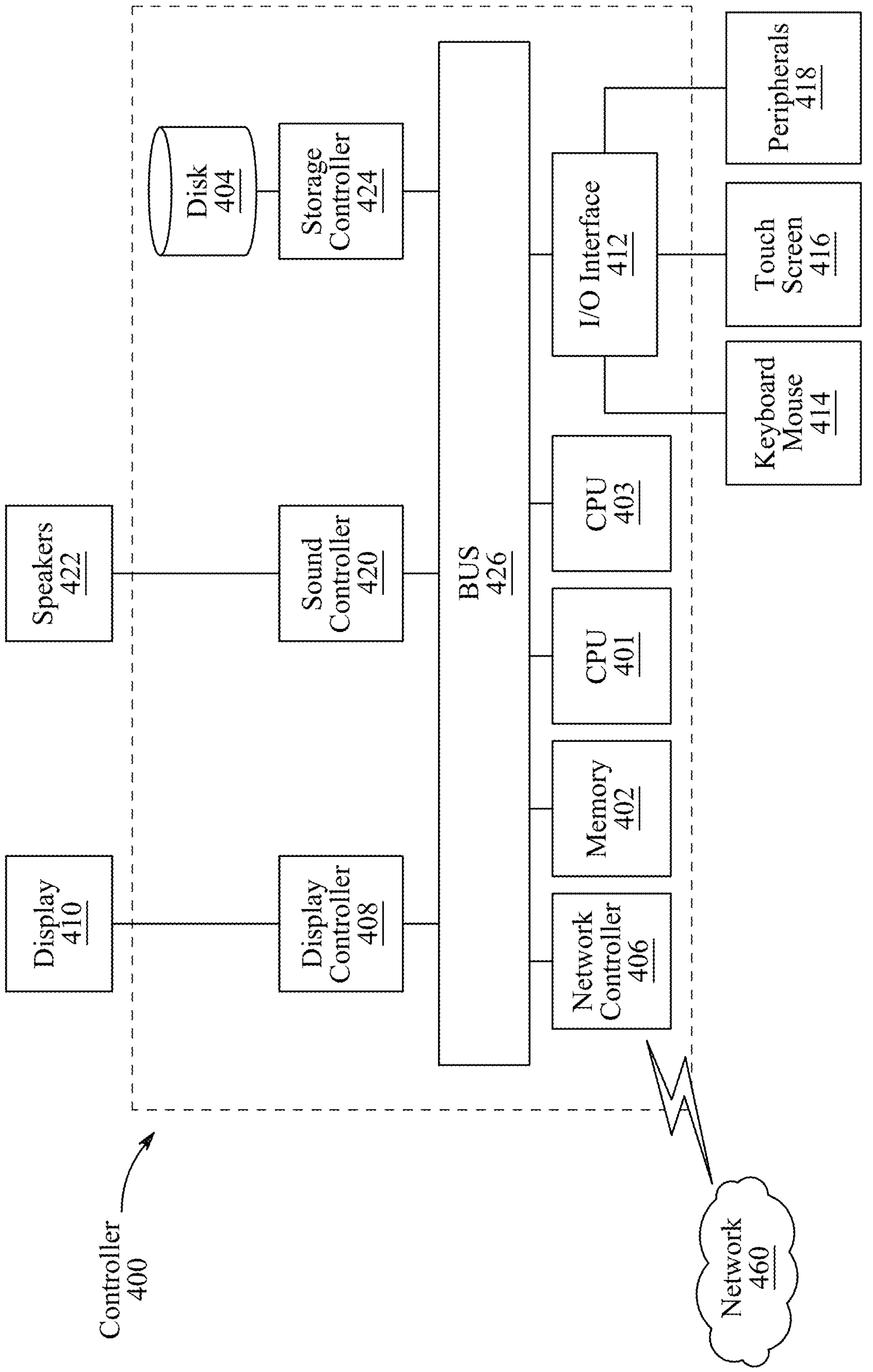
FIG. 4 is an illustration of a non-limiting example of details of computing hardware used in the computing system, according to certain embodiments.

Details of the hardware description of the computing environment according to exemplary embodiments is described with reference to FIG. 4. In FIG. 4, a controller 400 is described as representative of the system 100 in which the controller (e.g., microprocessor 106) is a computing device that includes a CPU 401, which performs the processes described above/below. The process data and instructions may be stored in memory 402. These processes and instructions may also be stored on a storage medium disk 404 such as a hard drive (HDD) or portable storage medium or may be stored remotely. Further, the present disclosure is not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the present disclosure may be provided as a utility application, background daemon, or component of an operating system, or combination thereof, executing in conjunction with CPU 401, 403 and an operating system such as Microsoft Windows 7, Microsoft Windows 10, UNIX, LINUX, Apple MAC-OS and other systems known to those skilled in the art. The hardware elements in order to achieve the computing device may be realized by various circuitry elements, known to those skilled in the art. For example, CPU 401 or CPU 403 may be a Xenon or Core processor from Intel of America or an Opteron processor from AMD of America, or may be other processor types that would be recognized by one of ordinary skill in the art. Alternatively, the CPU 401, 403 may be implemented on an FPGA, ASIC, PLD or using discrete logic circuits, as one of ordinary skill in the art would recognize. Further, CPU 401, 403 may be implemented as multiple processors cooperatively working in parallel to perform the instructions of the inventive processes described above.

The computing device in FIG. 18 also includes a network controller 406, such as an Intel Ethernet PRO network interface card from Intel Corporation of America, for interfacing with network 460. As can be appreciated, the network 460 can be a public network, such as the Internet, or a private network such as an LAN or WAN network, or any combination thereof and can also include PSTN or ISDN sub-networks. The network 460 can also be wired, such as an Ethernet network, or can be wireless such as a cellular network including EDGE, 3G, 4G, and 5G wireless cellular systems. The wireless network can also be WiFi, Bluetooth, or any other wireless form of communication that is known.

The computing device further includes a display controller 408, such as a NVIDIA Geforce GTX or Quadro graphics adaptor from NVIDIA Corporation of America for interfacing with display 410, such as a Hewlett Packard HPL2445w LCD monitor. A general purpose I/O interface 412 interfaces with a keyboard and/or mouse 414 as well as a touch screen panel 416 on or separate from display 410. General purpose I/O interface also connects to a variety of peripherals 418 including printers and scanners, such as an OfficeJet or DeskJet from Hewlett Packard.

A sound controller 420 is also provided in the computing device such as Sound Blaster X-Fi Titanium from Creative, to interface with speakers/microphone 422 thereby providing sounds and/or music. The general purpose storage controller 424 connects the storage medium disk 404 with communication bus 426, which may be an ISA, EISA, VESA, PCI, or similar, for interconnecting all of the components of the computing device. A description of the general features and functionality of the display 410, keyboard and/or mouse 414, as well as the display controller 408, storage controller 424, network controller 406, sound controller 420, and general purpose I/O interface 412 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown in FIG. 5.

Figure 5:
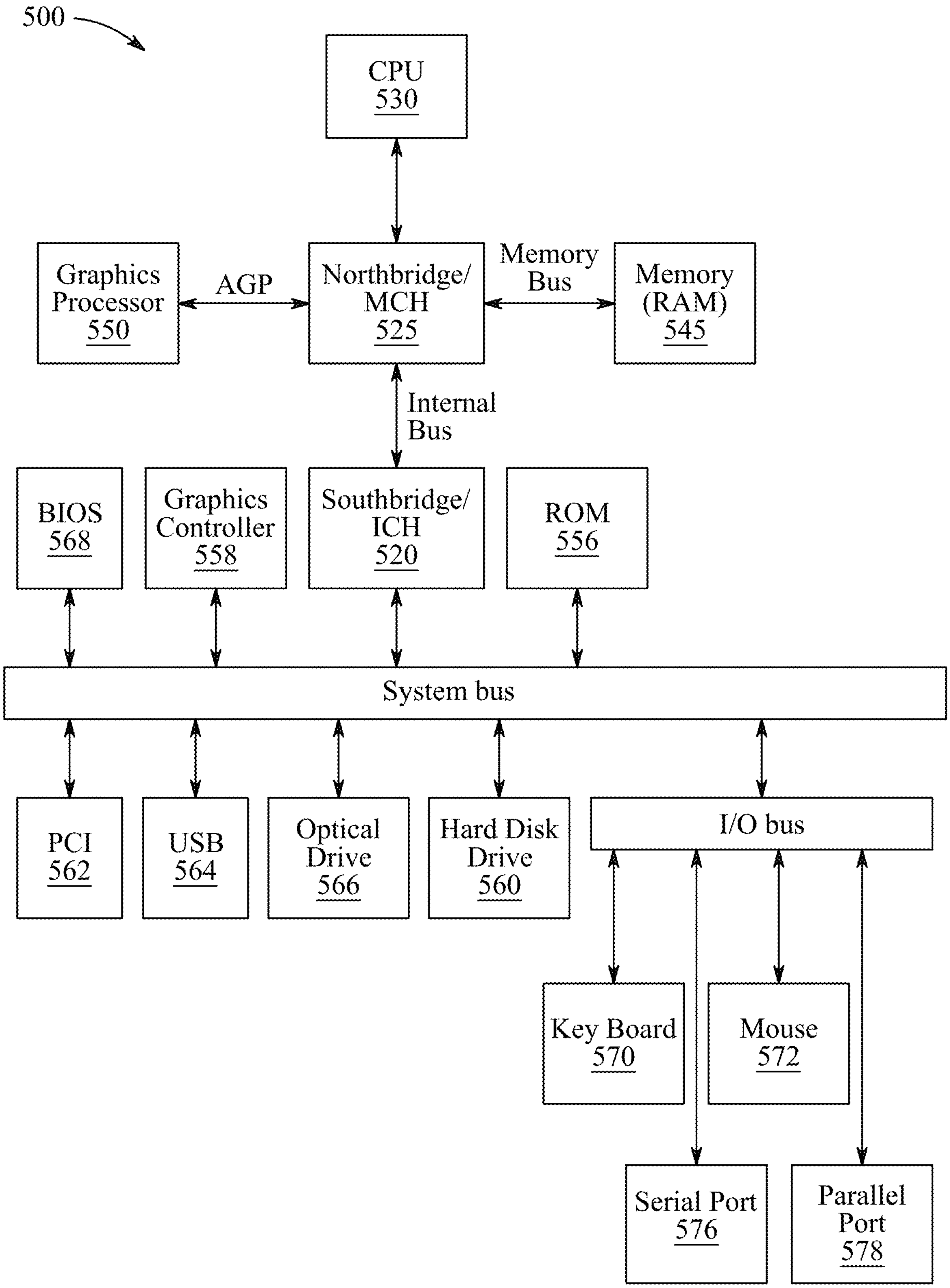
FIG. 5 is an exemplary schematic diagram of a data processing system used within the computing system, according to certain embodiments.

FIG. 5 shows a schematic diagram of a data processing system 500, according to certain embodiments, for performing the functions of the exemplary embodiments. The data processing system is an example of a computer in which code or instructions implementing the processes of the illustrative embodiments may be located. In FIG. 5, data processing system 500 employs a hub architecture including a north bridge and memory controller hub (NB/MCH) 525 and a south bridge and input/output (I/O) controller hub (SB/ICH) 520. The central processing unit (CPU) 530 is connected to NB/MCH 525. The NB/MCH 525 also connects to the memory 545 via a memory bus and connects to the graphics processor 550 via an accelerated graphics port (AGP). The NB/MCH 525 also connects to the SB/ICH 520 via an internal bus (e.g., a unified media interface or a direct media interface).

Figure 6:
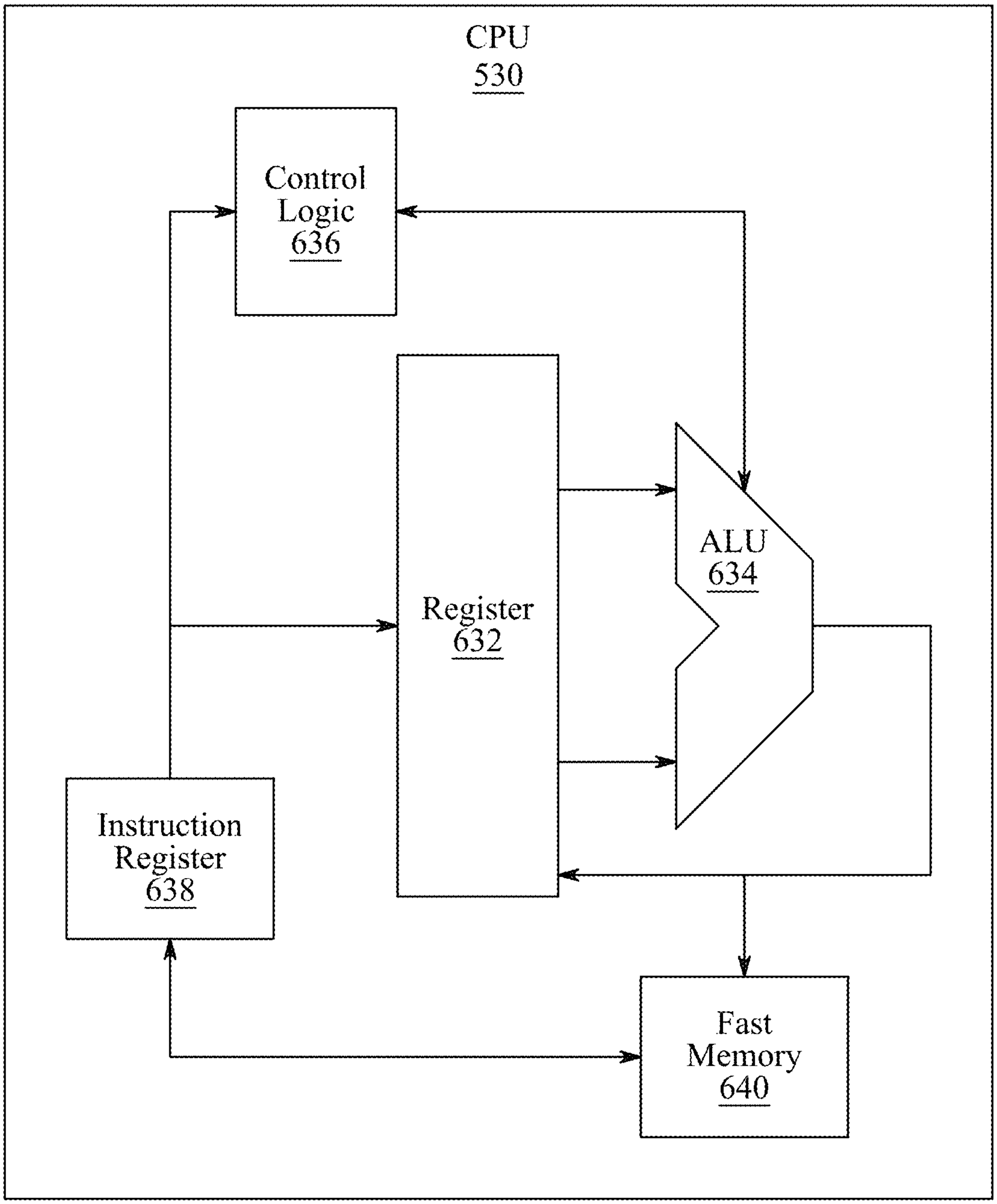
FIG. 6 is an exemplary schematic diagram of a processor used with the computing system, according to certain embodiments.

The CPU processing unit 530 may contain one or more processors and even may be implemented using one or more heterogeneous processor systems. For example, FIG. 6 shows one implementation of CPU 530. In one implementation, the instruction register 638 retrieves instructions from the fast memory 640. At least part of these instructions are fetched from the instruction register 638 by the control logic 636 and interpreted according to the instruction set architecture of the CPU 530. Part of the instructions can also be directed to the register 632. In one implementation the instructions are decoded according to a hardwired method, and in another implementation the instructions are decoded according a microprogram that translates instructions into sets of CPU configuration signals that are applied sequentially over multiple clock pulses. After fetching and decoding the instructions, the instructions are executed using the arithmetic logic unit (ALU) 634 that loads values from the register 632 and performs logical and mathematical operations on the loaded values according to the instructions. The results from these operations can be feedback into the register and/or stored in the fast memory 640.

According to certain implementations, the instruction set architecture of the CPU 530 can use a reduced instruction set architecture, a complex instruction set architecture, a vector processor architecture, or a very large instruction word architecture. Furthermore, the CPU 530 can be based on the Von Neuman model or the Harvard model. The CPU 530 can be a digital signal processor, an FPGA, an ASIC, a PLA, a PLD, or a CPLD. Further, the CPU 530 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 5, the data processing system 500 can include that the SB/ICH 520 is coupled through a system bus to an I/O bus, a read only memory (ROM) 556, universal serial bus (USB) port 564, a flash binary input/output system (BIOS) 568, and a graphics controller 558. PCI/PCIe devices can also be coupled to SB/ICH 520 through a PCI bus 562. The PCI devices may include, for example, Ethernet adapters, add-in cards, and PC cards for notebook computers. The hard disk drive 560 and CD-ROM 566 can use, for example, an integrated drive electronics (IDE) or serial advanced technology attachment (SATA) interface. In one implementation the I/O bus can include a super I/O (SIO) device. Further, the hard disk drive (HDD) 560 and optical drive 566 can also be coupled to the SB/ICH 520 through a system bus. In one implementation, a keyboard 570, a mouse 572, a parallel port 578, and a serial port 576 can be connected to the system bus through the I/O bus. Other peripherals and devices that can be connected to the SB/ICH 520 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry or based on the requirements of the intended back-up load to be powered. The functions and features described herein may also be executed by various distributed components of a system. For example, one or more processors may execute these system functions, wherein the processors are distributed across multiple components communicating in a network. The distributed components may include one or more client and server machines, which may share processing, as shown by FIG. 7, in addition to various human interface and communication devices (e.g., display monitors, smart phones, tablets, personal digital assistants (PDAs)).

Figure 7:
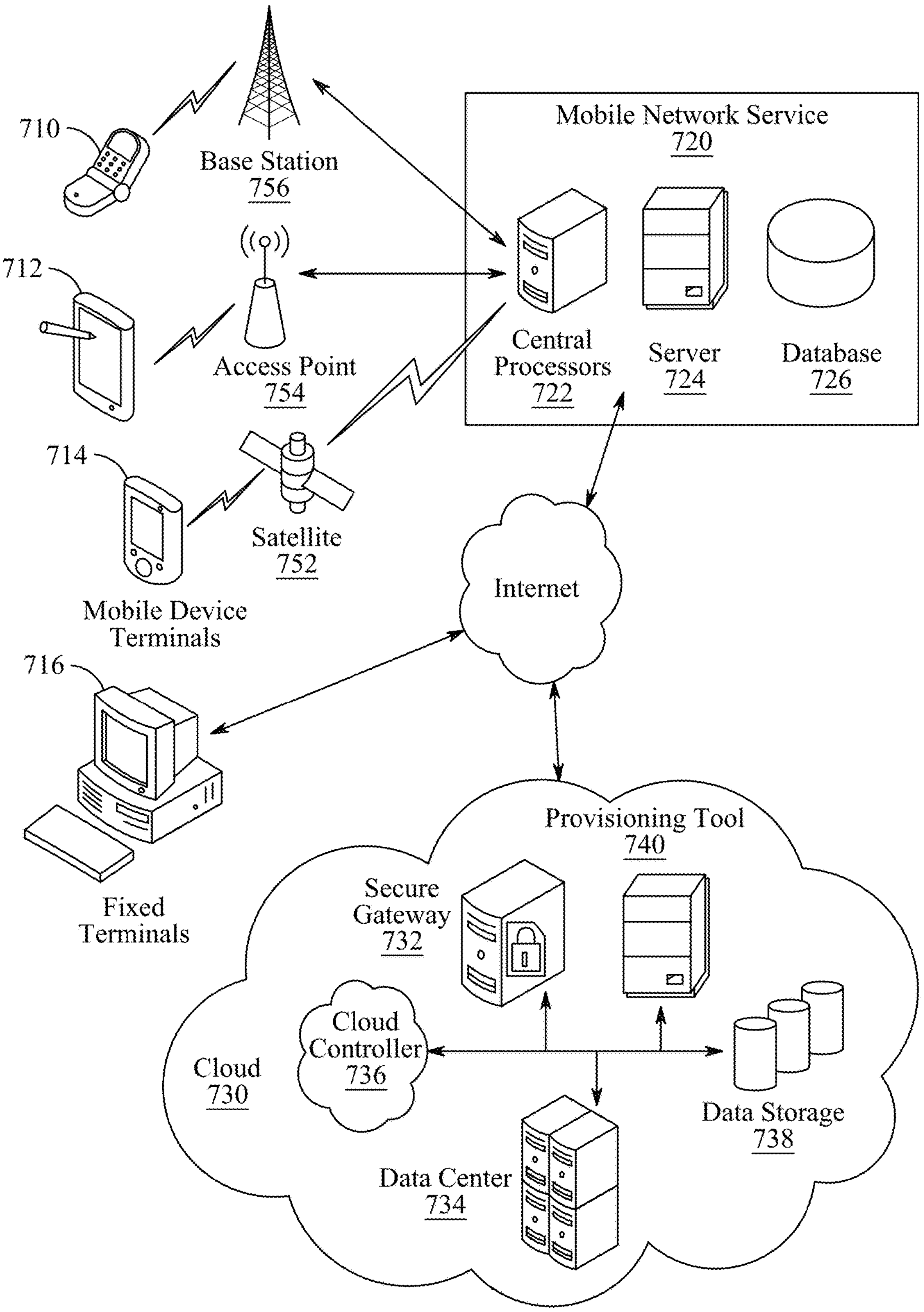
FIG. 7 is an illustration of a non-limiting example of distributed components which may share processing with the controller, according to certain embodiments.

More specifically, FIG. 7 illustrates client devices including a smart phone 710, a tablet 712, a mobile device terminal 714 and fixed terminals 716. These client devices may be communicatively coupled with a mobile network service 720 via a base station 756, an access point 754, a satellite 752 or via an internet connection. The mobile network service 720 may comprise central processors 722, a server 724 and a database 726. The fixed terminals 716 and the mobile network service 720 may be communicatively coupled via an internet connection to functions in cloud 730 that may comprise a security gateway 732, a data center 734, a cloud controller 736, a data storage 738 and a provisioning tool 740. The network may be a private network, such as the LAN or the WAN, or may be the public network, such as the Internet. Input to the system may be received via direct user input and received remotely either in real-time or as a batch process. Additionally, some implementations may be performed on modules or hardware not identical to those described. Accordingly, other implementations are within the scope that may be disclosed.

The first embodiment is illustrated with respect to FIG. 1-FIG. 7. The first embodiment describes the system 100 for the detection of the insect infestation in palm trees. The system 100 includes a plurality of sensors 102 configured to be located along a trunk of a palm tree 200, wherein each sensor is configured to collect periodic measurements and generate sensor data signals, and a sensor node 104 located at a midpoint of the palm tree 200, the sensor node 104 including a microprocessor 106 and a low-power wireless transceiver 108, wherein the microprocessor 106 includes an electrical circuitry 110, an input panel 112 wired to each of the plurality of sensors 102, and a memory 114 having program instructions including a machine learning model 116 having a classifier 118 stored therein, that, when executed by one or more processors 120, cause the one or more processors 120 to receive the sensor data signals from each of the plurality of sensors 102, apply the sensor data signals to the classifier 118, wherein the classifier 118 is configured to classify the sensor data signals into classes which indicate a type and a degree of an insect infestation, generate an insect infestation report, and transmit the insect infestation report to a remote server 122.

In an aspect, the insect infestation is due to red palm weevils and larvae of red palm weevils.

In an aspect, the plurality of sensors includes at least one tilt sensor 102-1 configured to be located above a midpoint of a palm tree trunk, at least one tilt sensor 102-2 configured to be located below the midpoint of the palm tree trunk, a first wind load sensor 102-3 configured to be located above the midpoint of the palm tree trunk, a second wind load sensor 102-4 configured to be located below the midpoint of the palm tree trunk, at least one accelerometer 102-5 configured to be located above the midpoint of the palm tree trunk, a humidity sensor 102-6 configured to be partially embedded near the midpoint of the palm tree trunk, a first plurality of ultrasonic transducers 102-7 configured to be located around a circumference of the palm tree trunk directly below the midpoint of the palm tree trunk, and a second plurality of ultrasonic transducers 102-8 configured to be located around a circumference of the palm tree trunk directly near a base of the palm tree trunk.

In an aspect, the microprocessor 106 is configured to monitor the sensor data signals generated by periodic sensor measurements made by the at least one tilt sensor 102-1 configured to be located above a midpoint of a palm tree trunk and the at least one tilt sensor 102-2 configured to be located below the midpoint of the palm tree trunk and record tilt angle deviations greater than three degrees which are sustained for greater than forty-eight hours which are indicative of internal structural degradation in the palm tree trunk.

In an aspect, the microprocessor 106 is configured to monitor sensor data signals generated by periodic sensor measurements made by the first wind load sensor 102-3 and the second wind load sensor 102-4, record a pressure of a wind and a direction of the wind, determine a stress on the palm tree trunk due to differences between the sensor data signals generated by the first wind load sensor 102-3 and the second wind load sensor 102-4, monitor a sway movement of the palm tree trunk and determine whether the differences between the sensor data signals generated by the first wind load sensor 102-3 and the second wind load sensor 102-3 indicate infestation internal to the palm tree trunk due to insect infestation.

In an aspect, the microprocessor 106 is configured to monitor the sway movement of the palm tree trunk at a sampling frequency in a range of about 12 Hz to about 50 Hz within a time window of about 10 seconds and during a wind speed in a range of about 10 km/hr and 30 km/hr.

In an aspect, the microprocessor 106 is configured to adjust the sampling frequency based on a geographical location of the sensor node 104 and a historical wind profile.

In an aspect, the microprocessor 106 is configured to monitor sensor data signals generated by periodic sensor measurements made by the at least one accelerometer 102-5 and detect irregular sway patterns and vibration indication of internal infestation of the palm tree trunk.

In an aspect, the microprocessor 106 is configured to monitor sensor data signals generated by periodic sensor measurements made by the humidity sensor 102-6 of moisture changes within the palm tree trunk, indicative of internal moisture distribution due to larval tunneling of insects.

In an aspect, the microprocessor 106 is configured to monitor sensor data signals generated by periodic sensor measurements made by the first plurality of ultrasonic transducers 102-7 and the second plurality of ultrasonic transducers 102-8 and map internal structure cavities within the palm tree trunk due to movement of insect larva.

In an aspect, the remote server 122 is a smartphone loaded with a smartphone application, wherein the smartphone application is configured to receive the insect infestation report from the sensor node 104, analyze the infestation report to determine a cavity mapping of the palm tree trunk, an angle shift history and a moisture profile and generate any one of a real-time alert, an infestation risk level, a recommended immediate action and geolocation information regarding the infestation.

In an aspect, a cloud based analytics platform in communication with the smartphone, wherein the cloud based analytics platform is configured to analyze the infestation report and generate historical trends and visual mapping.

In an aspect, the low-power wireless transceiver 108 includes an over-the-air update program configured to receive updates for the sensor node 104.

In an aspect, the classifier 118 is a lightweight one-dimensional convolutional neural network.

In an aspect, the classifier 118 is a decision tree network.

In an aspect, the sensor node 104 is configured to power on during a periodic wake-up interval in a range of one hour to two hours and collect the sensor data signals during a data collection interval in a range of 10 seconds to 20 seconds until the insect infestation is detected, then collect the sensor data signals about every 30 minutes.

An exemplary embodiment describes a method for detecting an insect infestation in palm trees. The method includes installing a plurality of sensors 102 along a trunk of a palm tree 200, collecting periodic measurements and generating sensor data signals by each sensor, and installing a sensor node 104 at a midpoint of the palm tree 200, the sensor node 104 including a microprocessor 106 and a low-power wireless transceiver 108, wherein the microprocessor 106 includes an electrical circuitry 110, an input panel 112 wired to each of the plurality of sensors 102, and a memory 114 having program instructions including a machine learning model 116 having a lightweight one-dimensional convolutional neural network classifier 118 stored therein, that, when executed by one or more processors 120, cause the one or more processors 120 to perform receiving the sensor data signals from each of the plurality of sensors 102, applying the sensor data signals to the lightweight one-dimensional convolutional neural network classifier 118, classifying, by the classifier 118, the sensor data signals into classes which indicate a type and a degree of an insect infestation, generating, by the microprocessor 106, an insect infestation report, and transmitting, with the low-power wireless transceiver 108, the insect infestation report to a remote server 122.

In an aspect, installing the plurality of sensors 102 along the trunk of the palm tree 200 includes installing at least one tilt sensor 102-1 above a midpoint of a palm tree trunk, installing at least one tilt sensor 102-2 below the midpoint of the palm tree trunk, installing a first wind load sensor 102-3 above the midpoint of the palm tree trunk, installing a second wind load sensor 102-4 below the midpoint of the palm tree trunk, installing at least one accelerometer 102-5 above the midpoint of the palm tree trunk, partially embedding a humidity sensor 102-6 near the midpoint of the palm tree trunk, installing a first plurality of ultrasonic transducers 102-7 around a circumference of the palm tree trunk directly below the midpoint of the palm tree trunk, and installing a second plurality of ultrasonic transducers 102-8 around a circumference of the palm tree trunk directly near a base of the palm tree trunk.

In an aspect, the method further includes monitoring the sensor data signals generated by periodic sensor measurements of: the at least one tilt sensor 102-1 installed above a midpoint of a palm tree trunk and the at least one tilt sensor 102-2 installed below the midpoint of the palm tree trunk and recording tilt angle deviations greater than three degrees which are sustained for greater than forty-eight hours which are indicative of internal structural degradation in the palm tree trunk, the first wind load sensor 102-3 and the second wind load sensor 102-4, recording a pressure of a wind and a direction of the wind, determining a stress on the palm tree trunk due to differences between the sensor data signals generated by the first wind load sensor 102-3 and the second wind load sensor 102-4, monitoring a sway movement of the palm tree trunk and determining whether the differences between the sensor data signals generated by the first wind load sensor 102-3 and the second wind load sensor 102-4 indicate infestation internal to the palm tree trunk due to insect infestation, the sway movement of the palm tree trunk at a sampling frequency in a range of about 12 Hz to about 50 Hz within a time window of about 10 seconds and during a wind speed in a range of about 10 km/hr and 30 km/hr and adjusting the sampling frequency based on a geographical location of the sensor node 104 and a historical wind profile, the humidity sensor 102-6 of moisture changes within the palm tree trunk indicative of internal moisture distribution due to larval tunneling of insects, and the first plurality of ultrasonic transducers 102-7 and the second plurality of ultrasonic transducers 102-8 and mapping internal structure cavities within the palm tree trunk due to movement of insect larva.

In an aspect, the method further includes transmitting, by the low-power wireless transceiver 108, the insect infestation report to a smartphone loaded with a smartphone application, wherein the smartphone application is configured to receive the insect infestation report, analyze the infestation report to determine a cavity mapping of the palm tree, an angle shift history and a moisture profile and generate any one of a real-time alert, an infestation risk level, a recommended immediate action and geolocation information regarding the infestation, receiving, by a cloud based analytics platform in communication with the smartphone, the infestation report, and generating, by the cloud based analytics platform, historical trends and visual mapping of the insect infestation.

Numerous modifications and variations of the present disclosure are possible in light of the above teachings. It is therefore to be understood that within the scope of the appended claims, the invention may be practiced otherwise than as specifically described herein.

The invention claimed is:

1. A system for detection of an insect infestation in a palm tree, comprising:

a plurality of sensors configured to be located along a trunk of a palm tree, wherein each sensor is configured to collect periodic measurements and generate sensor data signals, and wherein the plurality of sensors includes:

at least one tilt sensor configured to be located above a midpoint of a palm tree trunk;

at least one tilt sensor configured to be located below the midpoint of the palm tree trunk;

a first wind load sensor configured to be located above the midpoint of the palm tree trunk;

a second wind load sensor configured to be located below the midpoint of the palm tree trunk;

at least one accelerometer configured to be located above the midpoint of the palm tree trunk;

a humidity sensor configured to be partially embedded near the midpoint of the palm tree trunk;

a first plurality of ultrasonic transducers configured to be located around a circumference of the palm tree trunk directly below the midpoint of the palm tree trunk; and a second plurality of ultrasonic transducers configured to be located around a circumference of the palm tree trunk directly near a base of the palm tree trunk; and a sensor node located at a midpoint of the palm tree, the sensor node including a microprocessor and a low-power wireless transceiver, wherein the microprocessor includes an electrical circuitry, an input panel wired to each of the plurality of sensors, and a memory having program instructions including a machine learning model having a classifier stored therein, that, when executed by one or more processors, cause the one or more processors to:

receive the sensor data signals from each of the plurality of sensors, apply the sensor data signals to the classifier, wherein the classifier is configured to classify the sensor data signals into classes which indicate a type and a degree of an insect infestation, generate an insect infestation report, and transmit the insect infestation report to a remote server.

2. The system of claim 1, wherein the insect infestation is due to red palm weevils and larvae of red palm weevils.

3. The system of claim 1, wherein the microprocessor is configured to monitor the sensor data signals generated by periodic sensor measurements made by the at least one tilt sensor configured to be located above the midpoint of the palm tree trunk and the at least one tilt sensor configured to be located below the midpoint of the palm tree trunk and record tilt angle deviations greater than three degrees which are sustained for greater than forty-eight hours which are indicative of internal structural degradation in the palm tree trunk.

4. The system of claim 3, wherein the microprocessor is configured to monitor sensor data signals generated by periodic sensor measurements made by the first wind load sensor and the second wind load sensor, record a pressure of a wind and a direction of the wind, determine a stress on the palm tree trunk due to differences between the sensor data signals generated by the first wind load sensor and the second wind load sensor, monitor a sway movement of the palm tree trunk and determine whether the differences between the sensor data signals generated by the first wind load sensor and the second wind load sensor indicate infestation internal to the palm tree trunk due to insect infestation.

5. The system of claim 4, wherein the microprocessor is configured to monitor the sway movement of the palm tree trunk at a sampling frequency in a range of about 12 Hz to about 50 Hz within a time window of about 10 seconds and during a wind speed in a range of about 10 km/hr and 30 km/hr.

6. The system of claim 5, wherein the microprocessor is configured to adjust the sampling frequency based on a geographical location of the sensor node and a historical wind profile.

7. The system of claim 4, wherein the microprocessor is configured to monitor sensor data signals generated by periodic sensor measurements made by the at least one accelerometer and detect irregular sway patterns and vibration indication of internal infestation of the palm tree trunk.

8. The system of claim 7, wherein the microprocessor is configured to monitor sensor data signals generated by periodic sensor measurements made by the humidity sensor of moisture changes within the palm tree trunk indicative of internal moisture distribution due to larval tunneling of insects.

9. The system of claim 8, wherein the microprocessor is configured to monitor sensor data signals generated by periodic sensor measurements made by the first plurality of ultrasonic transducers and the second plurality of ultrasonic transducers and map internal structure cavities within the palm tree trunk due to movement of insect larva.

10. The system of claim 9, wherein the remote server is a smartphone loaded with a smartphone application, wherein the smartphone application is configured to receive the insect infestation report from the sensor node, analyze the infestation report to determine a cavity mapping of the palm tree trunk, an angle shift history and a moisture profile and generate any one of a real-time alert, an infestation risk level, a recommended immediate action and geolocation information regarding the infestation.

11. The system of claim 10, further comprising:
- a cloud based analytics platform in communication with the smartphone, wherein the cloud based analytics platform is configured to analyze the infestation report and generate historical trends and visual mapping.

12. The system of claim 1, wherein the low-power wireless transceiver includes an over-the-air update program configured to receive updates for the sensor node.

13. The system of claim 1, wherein the classifier is a lightweight one-dimensional convolutional neural network.

14. The system of claim 1, wherein the classifier is a decision tree network.

15. The system of claim 1, wherein the sensor node is configured to power on during a periodic wake-up interval in a range of one hour to two hours and collect the sensor data signals during a data collection interval in a range of 10 seconds to 20 seconds until the insect infestation is detected, then collect the sensor data signals about every 30 minutes.

16. A method for detecting an insect infestation in palm trees, comprising:
- installing a plurality of sensors along a trunk of a palm tree,
- wherein installing the plurality of sensors along the trunk of the palm tree comprises:
  - installing at least one tilt sensor above a midpoint of a palm tree trunk;
  - installing at least one tilt sensor below the midpoint of the palm tree trunk;
  - installing a first wind load sensor above the midpoint of the palm tree trunk;
  - installing a second wind load sensor below the midpoint of the palm tree trunk;
  - installing at least one accelerometer above the midpoint of the palm tree trunk;
  - partially embedding a humidity sensor near the midpoint of the palm tree trunk;
  - installing a first plurality of ultrasonic transducers around a circumference of the palm tree trunk directly below the midpoint of the palm tree trunk; and
  - installing a second plurality of ultrasonic transducers around a circumference of the palm tree trunk directly near a base of the palm tree trunk;
- collecting periodic measurements and generating sensor data signals by each sensor; and
- installing a sensor node at a midpoint of the palm tree, the sensor node including a microprocessor and a low-power wireless transceiver, wherein the microprocessor includes an electrical circuitry, an input panel wired to each of the plurality of sensors, and a memory having program instructions including a machine learning model having a lightweight one-dimensional convolutional neural network classifier stored therein, that, when executed by one or more processors, cause the one or more processors to perform:
- receiving the sensor data signals from each of the plurality of sensors,
- applying the sensor data signals to the lightweight one-dimensional convolutional neural network classifier,
- classifying, by the classifier, the sensor data signals into classes which indicate a type and a degree of an insect infestation,
- generating, by the microprocessor, an insect infestation report, and
- transmitting, with the low-power wireless transceiver, the insect infestation report to a remote server.

17. The method of claim 16, further comprising monitoring the sensor data signals generated by periodic sensor measurements of:
- the at least one tilt sensor installed above a midpoint of a palm tree trunk and the at least one tilt sensor installed below the midpoint of the palm tree trunk and recording tilt angle deviations greater than three degrees which are sustained for greater than forty-eight hours which are indicative of internal structural degradation in the palm tree trunk;
- the first wind load sensor and the second wind load sensor, recording a pressure of a wind and a direction of the wind, determining a stress on the palm tree trunk due to differences between the sensor data signals generated by the first wind load sensor and the second wind load sensor, monitoring a sway movement of the palm tree trunk and determining whether the differences between the sensor data signals generated by the first wind load sensor and the second wind load sensor indicate infestation internal to the palm tree trunk due to insect infestation;
- the sway movement of the palm tree trunk at a sampling frequency in a range of about 12 Hz to about 50 Hz within a time window of about 10 seconds and during a wind speed in a range of about 10 km/hr and 30 km/hr and adjusting the sampling frequency based on a geographical location of the sensor node and an historical wind profile;
- the humidity sensor of moisture changes within the palm tree trunk indicative of internal moisture distribution due to larval tunneling of insects; and
- the first plurality of ultrasonic transducers and the second plurality of ultrasonic transducers and mapping internal structure cavities within the palm tree trunk due to movement of insect larva.

18. The method of claim 17, further comprising:

transmitting, by the low-power wireless transceiver, the insect infestation report to a smartphone loaded with a smartphone application, wherein the smartphone application is configured to receive the insect infestation report, analyze the infestation report to determine a cavity mapping of the palm tree, an angle shift history and a moisture profile and generate any one of a real-time alert, an infestation risk level, a recommended immediate action and geolocation information regarding the infestation;

receiving, by a cloud based analytics platform in communication with the smartphone, the infestation report; and generating, by the cloud based analytics platform, historical trends and visual mapping of the insect infestation.

* * * * *